US009010391B2

(12) United States Patent
Hamanaka (10) Patent No.: US 9,010,391 B2
(45) Date of Patent: Apr. 21, 2015

(54) PNEUMATIC TIRE

(75) Inventor: Hideki Hamanaka, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 315 days.

(21) Appl. No.: 13/479,907

(22) Filed: May 24, 2012

(65) Prior Publication Data

US 2012/0305155 A1    Dec. 6, 2012

(30) Foreign Application Priority Data

Jun. 2, 2011   (JP) .................................. 2011-124372

(51) Int. Cl.
*B60C 11/12*   (2006.01)
*B60C 11/11*   (2006.01)
*B60C 11/03*   (2006.01)

(52) U.S. Cl.
CPC ......... *B60C 11/0306* (2013.04); *B60C 11/1236* (2013.04); *B60C 11/1204* (2013.04); *B60C 11/11* (2013.01); *B60C 2011/129* (2013.04); *B60C 2011/1213* (2013.04); *B60C 2200/06* (2013.04); *B60C 2011/0346* (2013.04); *B60C 2011/0355* (2013.04); *B60C 2011/0348* (2013.04); *B60C 2011/1254* (2013.04); *B60C 2011/0344* (2013.04); *Y10S 152/03* (2013.01)

(58) Field of Classification Search
CPC .................... B60C 11/1236; B60C 2011/1254
USPC .............. 152/209.18, 209.25, 209.27, DIG. 3
See application file for complete search history.

(56) References Cited

U.S. PATENT DOCUMENTS

| 5,031,680 | A  | * | 7/1991 | Kajikawa et al. | ........ 152/209.18 |
| 6,170,546 | B1 | * | 1/2001 | Koyama et al.   | ........ 152/209.18 |
| 7,416,004 | B2 | * | 8/2008 | Koya            | ........ 152/209.17 |
| 2010/0154952 | A1 | * | 6/2010 | Kageyama     | ........ 152/209.18 |

FOREIGN PATENT DOCUMENTS

| JP | H07-329517 |   | 12/1995 |
| JP | 10-203121  | * | 8/1998  |
| JP | 11-129709  | * | 5/1999  |

(Continued)

OTHER PUBLICATIONS

English machine translation of JP2009-241882, dated Oct. 2009.*

(Continued)

*Primary Examiner* — Justin Fischer
*Assistant Examiner* — Robert Dye
(74) *Attorney, Agent, or Firm* — Thorpe North & Western LLP (57) ABSTRACT

In a pneumatic tire, center land portions include a circumferential narrow groove extending in the tire circumferential direction so as to partition the center land portions in a tire width direction; a plurality of lug grooves disposed in each region of each of the center land portions partitioned by the circumferential narrow groove, extending in the tire width direction, so as to partition each of the regions of the center land portions in the tire circumferential direction; and a plurality of blocks partitioned by the circumferential narrow groove and the plurality of lug grooves. Blocks of the center land portions include one open sipe extending in the tire width direction so as to partition the blocks in the tire circumferential direction, and three or more closed sipes disposed in each of the regions of each of the blocks partitioned by the open sipe.

19 Claims, 8 Drawing Sheets

(56) References Cited

FOREIGN PATENT DOCUMENTS

| | | | |
|---|---|---|---|
| JP | H11-245631 | | 9/1999 |
| JP | 2006-103464 | * | 4/2006 |
| JP | 2008-307935 | | 12/2008 |
| JP | 2009-241882 | | 10/2009 |
| JP | 2011-000991 | * | 1/2011 |
| WO | WO2008/152914 | * | 12/2008 |
| WO | WO 2010/084848 | | 7/2010 |

OTHER PUBLICATIONS

English machine translation of JP11-129709, dated May 1999.*
English machine translation of WO2008/152914, dated Dec. 2008.*
English machine translation of JP10-203121, dated Aug. 1998.*
Chinese Office Action for Chinese Patent Application No. 201210177223.6 dated Jul. 8, 2014, 15 pages, China.

* cited by examiner

| | Conventional Example | Working Example 1 | Working Example 2 | Working Example 3 | Working Example 4 | Working Example 5 | Working Example 6 | Working Example 7 | Working Example 8 |
|---|---|---|---|---|---|---|---|---|---|
| Circumferential main grooves | 4 | 3 | 3 | 3 | 3 | 3 | 3 | 3 | 3 |
| Circumferential narrow groove | Present | Present | Present | Present | Present | Present | Present | Present | Present |
| Open sipe | Present | Present | Present | Present | Present | Present | Present | Present | Present |
| Closed sipes | 2 | 3 | 3 | 3 | 3 | 3 | 3 | 3 | 3 |
| b/a | 1.1 | 1.4 | 1.2 | 1.6 | 1.4 | 1.4 | 1.4 | 1.4 | 1.4 |
| W/b | 0.3 | 0.2 | 0.2 | 0.2 | 0.25 | 0.2 | 0.2 | 0.2 | 0.2 |
| H2/H1 | 0.8 | 0.6 | 0.6 | 0.6 | 0.6 | 0.5 | 0.7 | 0.8 | 0.6 |
| Block arrangement | Staggered arrangement | Staggered arrangement | Staggered arrangement | Staggered arrangement | Staggered arrangement | Staggered arrangement | Staggered arrangement | Staggered arrangement | Lattice arrangement |
| θ [deg] | 0 | 10 | 10 | 10 | 10 | 10 | 10 | 10 | 10 |
| Semi-closed sipe | Absent | Present | Present | Present | Present | Present | Present | Present | Present |
| Notch in the blocks | Absent | Present | Present | Present | Present | Present | Present | Present | Present |
| Shape of closed sipes | Straight | Bent shape | Bent shape | Bent shape | Bent shape | Bent shape | Bent shape | Bent shape | Bent shape |
| Shape of the open sipe | Straight | Zigzag shape | Zigzag shape | Zigzag shape | Zigzag shape | Zigzag shape | Zigzag shape | Zigzag shape | Zigzag shape |
| Amplitude A | - | 2 | 2 | 2 | 2 | 2 | 2 | 2 | 2 |
| Performance on ice | 100 | 115 | 117 | 112 | 116 | 115 | 115 | 116 | 115 |
| Performance on snow | 100 | 115 | 115 | 115 | 117 | 114 | 116 | 117 | 115 |
| Uneven wear resistance performance | 100 | 110 | 107 | 113 | 107 | 112 | 108 | 106 | 105 |

FIG. 7a

| | Working Example 9 | Working Example 10 | Working Example 11 | Working Example 12 | Working Example 13 | Working Example 14 | Working Example 15 | Working Example 16 | Working Example 17 |
|---|---|---|---|---|---|---|---|---|---|
| Circumferential main grooves | 3 | 3 | 3 | 3 | 3 | 3 | 3 | 3 | 3 |
| Circumferential narrow groove | Present | Present | Present | Present | Present | Present | Present | Present | Present |
| Open sipe | Present | Present | Present | Present | Present | Present | Present | Present | Present |
| Closed sipes | 3 | 3 | 3 | 3 | 3 | 3 | 3 | 3 | 3 |
| b/a | 1.4 | 1.4 | 1.4 | 1.4 | 1.4 | 1.4 | 1.4 | 1.4 | 1.4 |
| W/b | 0.2 | 0.2 | 0.2 | 0.2 | 0.2 | 0.2 | 0.2 | 0.2 | 0.2 |
| H2/H1 | 0.6 | 0.6 | 0.6 | 0.6 | 0.6 | 0.6 | 0.6 | 0.6 | 0.6 |
| Block arrangement | Staggered arrangement | Staggered arrangement | Staggered arrangement | Staggered arrangement | Staggered arrangement | Staggered arrangement | Staggered arrangement | Staggered arrangement | Staggered arrangement |
| θ [deg] | 0 | 5 | 15 | 10 | 10 | 10 | 10 | 10 | 10 |
| Semi-closed sipe | Present | Present | Present | Absent | Present | Present | Present | Present | Present |
| Notch in the blocks | Present | Present | Present | Present | Absent | Present | Present | Present | Present |
| Shape of closed sipes | Bent shape | Bent shape | Bent shape | Bent shape | Bent shape | Straight | Bent shape | Bent shape | Bent shape |
| Shape of the open sipe | Zigzag shape | Zigzag shape | Zigzag shape | Zigzag shape | Zigzag shape | Zigzag shape | Straight | Zigzag shape | Zigzag shape |
| Amplitude A | 2 | 2 | 2 | 2 | 2 | 2 | - | 1 | 3 |
| Performance on ice | 111 | 113 | 117 | 114 | 114 | 112 | 110 | 112 | 118 |
| Performance on snow | 110 | 113 | 117 | 115 | 113 | 115 | 113 | 114 | 116 |
| Uneven wear resistance performance | 114 | 112 | 108 | 105 | 110 | 110 | 113 | 112 | 108 |

PNEUMATIC TIRE

PRIORITY CLAIM

Priority is claimed to Japan Patent Application Serial No. 2011-124372 filed on Jun. 2, 2011.

BACKGROUND

1. Technical Field

The present technology relates to a pneumatic tire, and particularly relates to a pneumatic tire whereby performance on snow and ice can be enhanced.

2. Related Art

Ordinary studless tires have a plurality of grooves and a plurality of sipes that enhance snow discharge properties, water discharge properties, and edge effects, which leads to performance on snow and ice (performance on snow and performance on ice) being enhanced. The technology described in Japanese Unexamined Patent Application Publication No. 2009-241882A is known as a conventional pneumatic tire that is configured in this manner.

SUMMARY

The present technology provides a pneumatic tire whereby performance on snow and ice is enhanced. A pneumatic tire according to the present technology includes three or more circumferential main grooves extending in a tire circumferential direction, two or more rows of center land portions and a pair of shoulder land portions partitioned by the circumferential main grooves. The center land portions include: a circumferential narrow groove extending in the tire circumferential direction so as to partition the center land portions in a tire width direction; a plurality of lug grooves disposed in each region of each of the center land portions partitioned by the circumferential narrow groove, extending in the tire width direction so as to partition each of the regions of the center land portions in the tire circumferential direction; and a plurality of blocks partitioned by the circumferential narrow groove and the plurality of lug grooves. The blocks comprise one open sipe extending in the tire width direction so as to partition the blocks in the tire circumferential direction; and three or more closed sipes disposed in each of the regions of each of the blocks partitioned by the open sipe.

Additionally, with the pneumatic tire according to the present technology, a relationship between a width direction length a and a circumferential direction length b of the blocks is preferably such that $1.2 \leq b/a \leq 1.6$.

Additionally, with the pneumatic tire according to the present technology, a relationship between a groove width W of the lug grooves and the circumferential direction length b of the blocks is preferably such that $0.20 \leq W/b \leq 0.25$.

Additionally, with the pneumatic tire according to the present technology, a relationship between a groove depth H2 of the circumferential narrow groove and a groove depth H1 of the deepest circumferential main groove is preferably such that $0.50 \leq H2/H1 \leq 0.70$.

Additionally, with the pneumatic tire according to the present technology, the plurality of blocks is preferably disposed in a staggered manner in the tire circumferential direction.

Additionally, with the pneumatic tire according to the present technology, the circumferential narrow groove preferably has a zigzag shape, and an angle of inclination θ of the circumferential narrow groove with respect to the tire circumferential direction is preferably within a range $5 [\deg] \leq \theta \leq 15 [\deg]$.

Additionally, with the pneumatic tire according to the present technology, the blocks preferably have a semi-closed sipe that is open to an edge of the blocks in the tire width direction.

Additionally, with the pneumatic tire according to the present technology, the blocks preferably have a notch at an opening of the open sipe to the circumferential narrow groove.

Additionally, with the pneumatic tire according to the present technology, the closed sipes preferably have a bent shape.

Additionally, with the pneumatic tire according to the present technology, the open sipe preferably has a zigzag shape, and an amplitude A of the zigzag shape is preferably within a range $1.0 [mm] \leq A \leq 3.0 [mm]$.

With the pneumatic tire according to the present technology, blocks of center land portions are bisected in a tire circumferential direction by one open sipe, and each divided region thereof has three or more closed sipes. Therefore, the edge component of the blocks is ensured. Such a configuration is beneficial because performance on snow and ice of the tire is enhanced.

DETAILED DESCRIPTION

The present technology is explained in detail below with reference to the accompanying drawing. However, the present technology is not limited to this embodiment. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
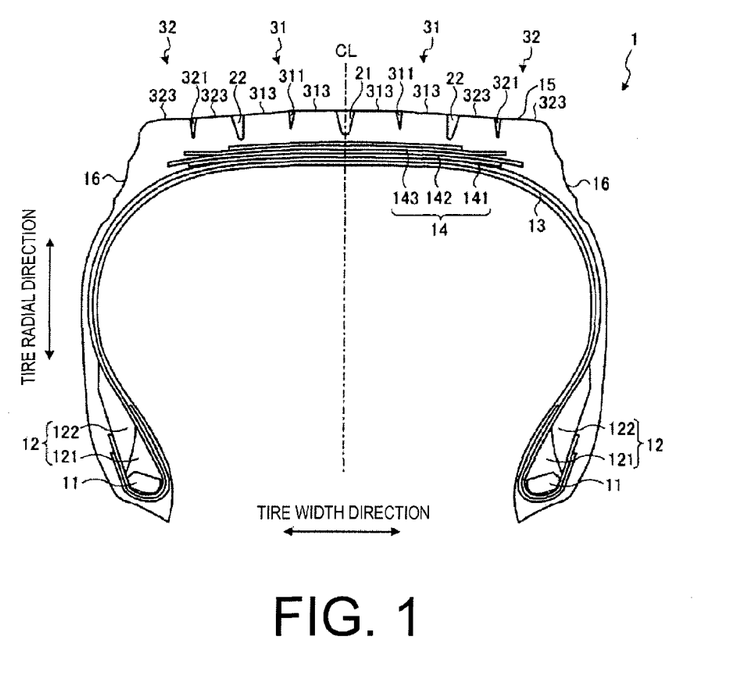
FIG. 1 is a cross-sectional view in a tire meridian direction illustrating a pneumatic tire according to an embodiment of the present technology.
Figure 2:
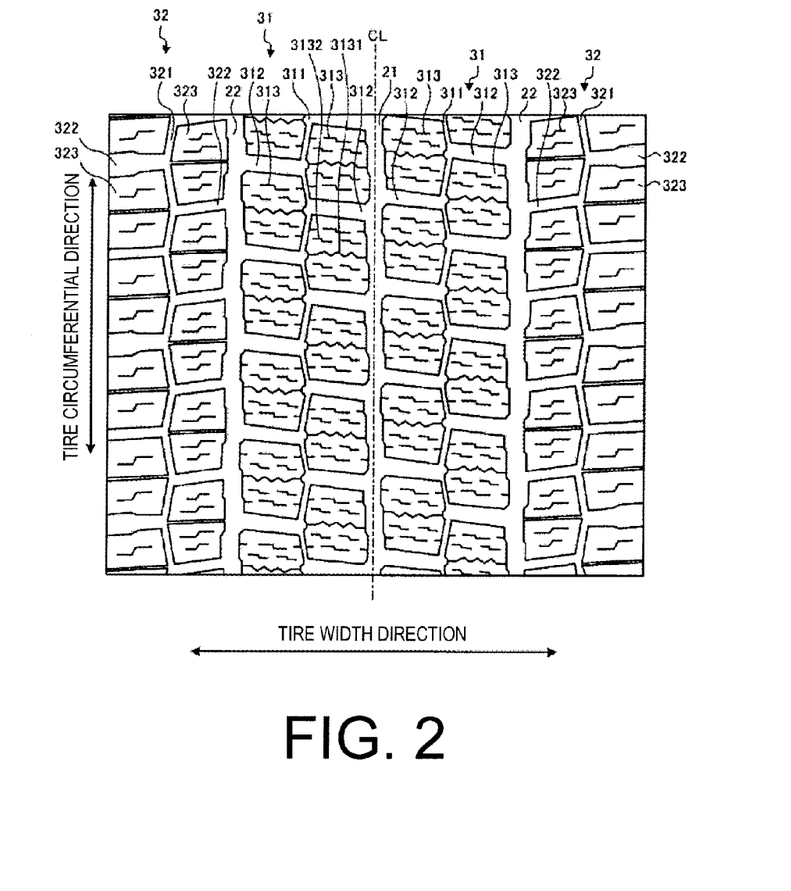
FIG. 2 is a plan view illustrating a tread surface of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread surface of the pneumatic tire depicted in FIG. 1. These drawings illustrate a studless tire.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1). The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a plurality of belt plies 141 to 143 that are laminated, and is disposed in the tire radial direction on a periphery of the carcass layer 13. These belt plies 141 to 143 are formed by arranging and roll processing a plurality of belt cords made from steel material or organic fiber material. A crossply structure is achieved by arranging the belt cords so as to incline in mutually different directions in a tire circumferential direction. The tread rubber 15 is disposed on the periphery of the carcass layer 13 and the belt layer 14 in the tire radial direction, and forms a tread portion. The pair of side wall rubbers 16, 16 is disposed on each outer side of the carcass layer 13 in the tire width direction, so as to form left and right sidewall portions of the tire.

Additionally, the pneumatic tire 1 includes three or more circumferential main grooves 21 and 22 extending in the tire circumferential direction, two or more rows of center land portions 31,31 and a pair of shoulder land portions 32 partitioned by these circumferential main grooves 21 and 22 (see FIG. 2). Moreover, each of these center land portions 31 has a circumferential narrow groove 311, a plurality of lug grooves 312, and a plurality of blocks 313. The circumferential narrow groove 311 extends in the tire circumferential direction so as to partition the center land portions 31 in the tire width direction. The plurality of lug grooves 312 are disposed in each of the left and right regions of the center land portions 31 partitioned by the circumferential narrow groove 311, and extend in the tire width direction so as to partition each region of the center land portions 31 in the tire circumferential direction. Two rows of blocks arranged in the tire circumferential direction are partitioned by the circumferential narrow groove 311 and the plurality of lug grooves 312.

For example, in this embodiment, the pneumatic tire 1 includes three circumferential main grooves 21 and 22, and two rows of the center land portions 31,31 and the pair of left and right shoulder land portions 32,32 are partitioned by the circumferential main grooves 21 and 22. Additionally, a tread pattern is formed that is left-right symmetrical, based on a tire equator line CL.

Furthermore, the circumferential narrow groove 311 extends in a zigzag manner in the tire circumferential direction and bisects the center land portions 31 in the tire width direction. Additionally, the plurality of lug grooves 312 are disposed in each of the regions of each of the bisected center land portions 31. Moreover, each of the lug grooves 312 is disposed in the tire circumferential direction at a predetermined pitch, and extends in the tire width direction from the circumferential narrow groove 311 so as to open to one of the circumferential main grooves 21 and 22. As a result, two rows of blocks are formed within one of the center land portions 31 by the circumferential main grooves 21 and 22 on the left and right of the center land portion 31, one circumferential narrow groove 311, and the plurality of lug grooves 312. Moreover, the lug grooves 312 of the left and right regions are offset in the tire circumferential direction and, thereby, the plurality of blocks 313 is disposed in a staggered manner in the tire circumferential direction having the circumferential narrow groove 311 as an axis thereof.

Additionally, the shoulder land portions 32 each have a circumferential narrow groove 321, a plurality of lug grooves 322, and a plurality of blocks 323 partitioned by the circumferential narrow groove 321 and the plurality of lug grooves 322. The circumferential narrow groove 321 extends in the tire circumferential direction so as to partition the shoulder land portions 32 in the tire width direction. The lug grooves 322 are disposed in each of the regions of the shoulder land portions 32 partitioned by the circumferential narrow groove 321, and extend in the tire width direction so as to partition each region of each of the shoulder land portions 32 in the tire circumferential direction. As a result, two rows of blocks are formed within one of the shoulder land portions 32, and the plurality of blocks 323 are disposed in a staggered manner in the tire circumferential direction having the circumferential narrow groove 321 as an axis thereof.

Note that "circumferential main grooves" refer to circumferential grooves having a groove width of 4.0 [mm] or greater. Additionally, "circumferential narrow groove" refers to a circumferential groove having a groove width that is less than 4.0 [mm] and greater than or equal to 1.0 [mm]. Moreover, "lug grooves" refer to lateral grooves having a groove width of 3.0 [mm] or greater.

Note that in this embodiment, three of the circumferential main grooves 21 and 22 are disposed (see FIG. 2). With such a configuration, the size of the blocks 313 can be increased compared to a configuration where four or more circumferential main grooves are disposed. This is preferable because it results in the rigidity of the blocks 313 being increased and uneven wear resistance performance of the tire being enhanced. However, the configuration is not limited to such and four or more circumferential main grooves may be disposed (not illustrated in the drawings).

Sipes of the Blocks

Ordinary studless tires have a plurality of grooves and a plurality of sipes that enhance snow discharge properties, water discharge properties, and edge effects, which leads to performance on snow and ice (performance on snow and performance on ice) being enhanced.

Therefore, the pneumatic tire 1 uses the following configuration in order to enhance performance on snow and ice.

Figure 3:
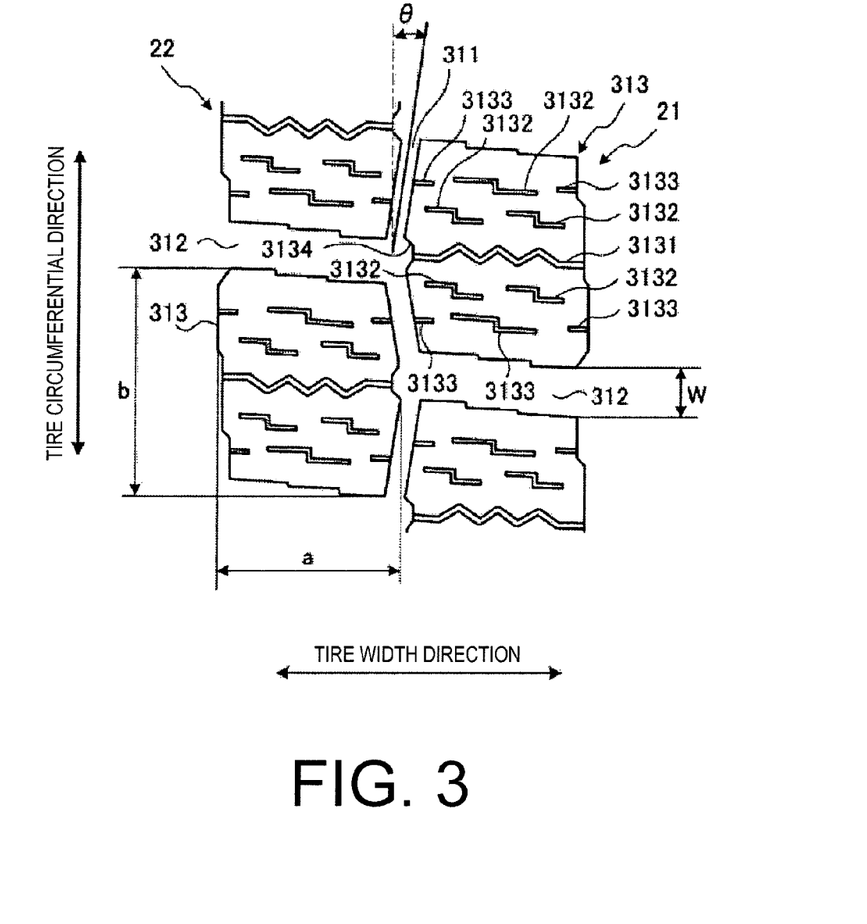
FIG. 3 is an enlarged view illustrating rows of blocks of the center land portions depicted in FIG. 2.
Figure 4:
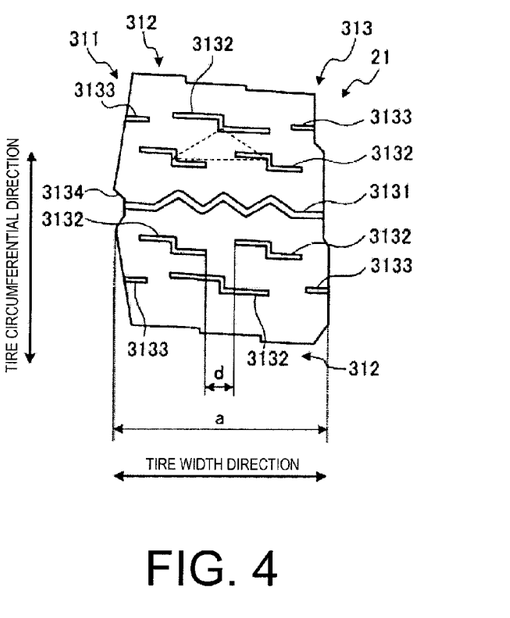
FIG. 4 is a plan view illustrating a block of the rows of blocks depicted in FIG. 3.
Figure 5:
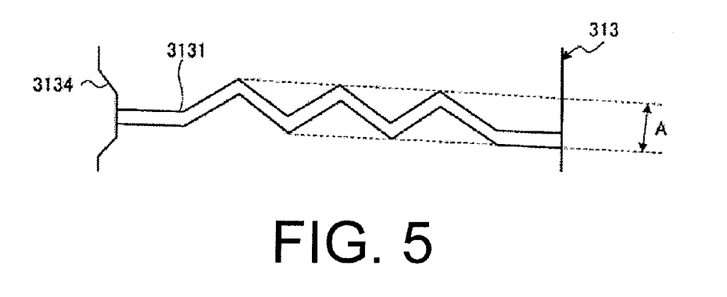
FIG. 5 is an explanatory drawing illustrating an open sipe of the block depicted in FIG. 4.

FIG. 3 is an enlarged view illustrating rows of blocks of the center land portions depicted in FIG. 2. FIG. 4 is a plan view illustrating a block of the rows of blocks depicted in FIG. 3. FIG. 5 is an explanatory drawing illustrating an open sipe of the block depicted in FIG. 4.

With this pneumatic tire 1, the blocks 313 of the center land portions 31 have one open sipe 3131 and a plurality of closed sipes 3132 (see FIGS. 3 and 4). The open sipe 3131 extends in the tire width direction so as to partition the blocks 313 in the tire circumferential direction. The plurality of the closed sipes 3132 is disposed in each region of each of the blocks 313 partitioned by the open sipe 3131. Additionally, three or more of the closed sipes 3132 are disposed in each of the regions. As a result, the edge component of the blocks 313 is ensured and the performance on snow and ice of the tire is enhanced.

For example, in this embodiment, the blocks 313 have a substantially rectangular shape that is longer in the tire circumferential direction. Additionally, the one open sipe 3131 crosses a center portion of the blocks 313 in the tire width direction so as to bisect the blocks 313 in the tire circumferential direction. As a result, the blocks 313 are partitioned into two regions having substantially the same shape. Moreover, three of the closed sipes 3132, extending in the tire width direction, are disposed in each of the regions of each of the divided blocks 313.

Additionally, a relationship between a width direction length a and a circumferential direction length b of the blocks 313 is such that 1.2≤b/a≤1.6 (see FIG. 3). Thus, the blocks 313 have a shape that is longer in the tire circumferential direction. As a result, an aspect ratio b/a of the blocks 313 is optimized and uneven wear resistance performance and performance on ice of the tire are both achieved.

Additionally, a relationship between a groove width W of the lug grooves 312 and the circumferential direction length b of the blocks 313 is such that 0.20≤W/b≤0.25 (see FIG. 3). As a result, the groove width W of the lug grooves 312 is optimized; snow discharge properties and water discharge properties of the lug grooves 312, and edge effects of the blocks 313 are ensured; and the performance on snow and ice of the tire is enhanced.

Note that in this embodiment, the circumferential direction length b of the blocks 313 is set within a range of 33.0 [mm] or greater to 38.0 [mm] or less. As a result, block rigidity with respect to the tire circumferential direction is ensured.

Additional Data

Additionally, with this pneumatic tire 1, a relationship between the groove depth H2 of the circumferential narrow groove 321 and the groove depth H1 of the deepest circumferential main groove 22 is preferably such that 0.50≤H2/H1≤0.70. As a result, traction properties are ensured and performance on snow and ice of the tire is enhanced. Note that in this embodiment, the left and right circumferential main grooves 22,22, which are outermost in the tire width direction, have the greatest groove depth.

Additionally, the plurality of blocks 313 is preferably disposed in a staggered manner in the tire circumferential direction (see FIG. 2). In other words, the plurality of lug grooves 312 is preferably disposed in a staggered manner in the tire circumferential direction having the circumferential narrow groove 311 as an axis thereof. With such a configuration, the lug grooves 312 to the left and right of the circumferential narrow groove 311 are disposed so as to be mutually offset and, therefore, concentration of stress in each of the blocks 313 when the tire contacts the ground is suppressed. As a result, the uneven wear resistance performance of the tire is enhanced.

However, the present technology is not limited thereto and the center land portions 31 may have rows of blocks partitioned in a lattice-like manner by comprising the circumferential narrow groove 311 and lug grooves that pass through the center land portions 31 in the tire width direction so as to be open to the left and right circumferential main grooves 21 and 22 (not illustrated in the drawings).

Additionally, an angle of inclination θ of the circumferential narrow groove 311 with respect to the tire circumferential direction is preferably within a range 5 [deg]≤θ≤15 [deg] (see FIG. 3). For example, in this embodiment, the circumferential narrow groove 311 extends in the tire circumferential direction while bending in a zigzag shape and, therefore, a center portion of the edge of the circumferential narrow groove 311 side of the blocks 313 is convex in the tire width direction. Additionally, the edge of the blocks 313 is inclined with respect to the tire circumferential direction at the angle of inclination θ described above at a portion partitioned by a straight portion of the circumferential narrow groove 311. With such a configuration, the circumferential narrow groove 311 has an optimal angle of inclination θ and, therefore, the edge component of the blocks 313 with respect to the tire circumferential direction is ensured and the performance on snow and ice of the tire is enhanced.

Additionally, the blocks 313 preferably have a semi-closed sipe 3133 that is open to an edge of the blocks 313 in the tire width direction (see FIG. 4). For example, in this embodiment, two of the semi-closed sipes 3133 are disposed in each of the regions of each of the blocks 313 partitioned by the open sipe 3131, and extend in the tire width direction so as to open respectively to one of the edges in the tire width direction of each region. Additionally, a relationship between a depth. H3 of these semi-closed sipes 3133 and a groove depth H1 of the deepest circumferential main groove 22 is such that 0.40≤H3/H1≤0.50. With such a configuration, uneven wear at the edges of the blocks 313 in the tire width direction is suppressed. Note that it is not preferable that the sipe depth of the semi-closed sipes is excessive because tears will easily form, starting from the semi-closed sipes.

Additionally, the blocks 313 preferably have a notch 3134 at an opening of the open sipe 3131 to the circumferential narrow groove 311 (see FIGS. 3 and 4). For example, in this embodiment, the circumferential narrow groove 311 extends in the tire circumferential direction while bending in a zigzag shape and, therefore, the edge of the circumferential narrow groove 311 side of the blocks 313 is convex in the tire width direction. Additionally, the open sipe 3131 is open to the bent portion of the circumferential narrow groove 311 (the top of the portion where the edge of the blocks 313 is convex). Moreover, the recessed notch 3134 is formed at this position on an inner side of the blocks 313. With such a configuration, the edge component of the blocks 313 increases due to the notch 3134, and the performance on snow and ice of the tire is enhanced.

Additionally, the closed sipes 3132 have a bent shape (see FIG. 4). For example, in this embodiment, the closed sipes 3132 extend in the tire width direction while bending in a step shape or a crank shape. With such a configuration, compared with closed sipes having a straight shape, a sipe length of the closed sipes 3132 is longer. As a result, the edge component of the blocks 313 increases and performance on ice of the tire is enhanced.

Additionally, the open sipe 3131 has a zigzag shape and an amplitude A of the zigzag shape is within a range 1.0 [mm] ≤A≤3.0 [mm] (see FIG. 5). With such a configuration, the edge component of the blocks 313 increases due to the zigzag shape, and the performance on ice of the tire is enhanced. Additionally, the amplitude A of the zigzag shape is optimized and, therefore, the uneven wear resistance performance of the tire is enhanced.

Additionally, the arrangement of the closed sipes 3132 in each of the regions partitioned by the open sipe 3131 is preferably a truss arrangement having a bottom side on the open sipe 3131 side (see FIG. 4). Specifically, imaginary lines joining center points (center points of the sipe length) of the closed sipes 3132 in each of the regions preferably form a rough triangular shape having a bottom side on the open sipe 3131 side (or a rough trapezoidal shape having a long side on the open sipe 3131 side). For example, in this embodiment, two of the closed sipes 3132 of the three closed sipes 3132 are disposed so as to be in line with each other and adjacent to the open sipe 3131 in each of the regions of the blocks 313. Additionally, the remaining one closed sipe 3132 is disposed more toward the circumferential direction edge side of the blocks 313 than the other two closed sipes 3132. Thus, the imaginary lines joining the center points of these closed sipes 3132 form a triangular shape (truss arrangement). With such a configuration, the edge component of the blocks 313 increases due to the closed sipes 3132 and, on the other hand, rigidity of the edges of the blocks 313 is ensured by the truss arrangement. As a result, the uneven wear resistance of the tire is enhanced.

Additionally, two of the closed sipes 3132,3132 are disposed so as to be adjacent to the open sipe 3131 (see FIG. 4). Such a configuration is preferable because, compared to a configuration in which a long and single closed sipe is disposed so as to be adjacent to the open sipe (not illustrated in the drawings), block rigidity is enhanced and the uneven wear resistance performance is enhanced. Moreover, here, a relationship between a disposal pitch d of the two closed sipes 3132,3132 and the width direction length a of the blocks 313 is preferably such that $0.10 \leq d/a \leq 0.30$. As a result, uneven wear resistance performance and performance on snow and ice are both achieved. For example, it is not preferable that $d/a<0.10$ because block rigidity will decline and uneven wear resistance performance will decrease. Moreover, it is not preferable that $0.30<d/a$ because the line segment of the closed sipes will be reduced and the performance on snow and ice will decline.

The edges of the blocks 313 in the tire width direction preferably have a zigzag shape (see FIGS. 2 and 4). For example, in this embodiment, the circumferential main grooves 21 and 22 are zigzag grooves extending in the tire circumferential direction while bending in a step-like manner, and the edges of the blocks 313 on the circumferential main grooves 21 and 22 sides have a step-like zigzag shape. As a result, the edge component of the blocks 313 increases and performance on ice of the tire is enhanced.

Modified Example

Figure 6:
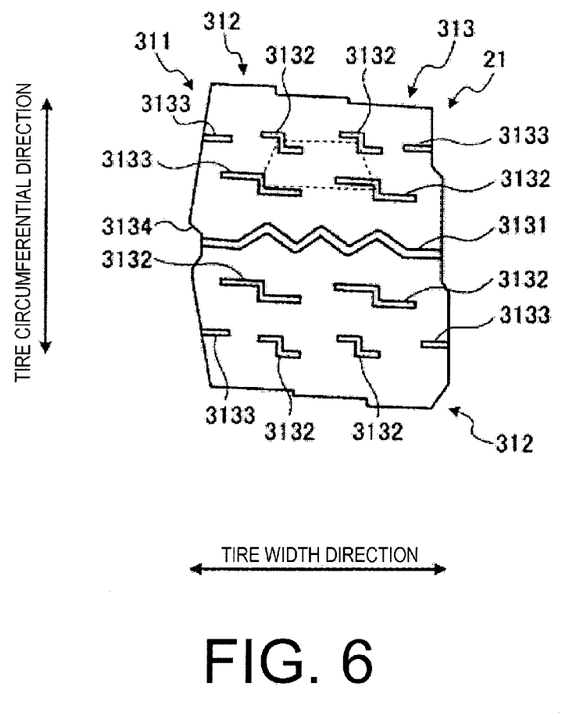
FIG. 6 is an explanatory drawing illustrating a modified example of the pneumatic tire depicted in FIG. 1.

FIG. 6 is an explanatory view of a modified example of the pneumatic tire depicted in FIG. 1.

With the pneumatic tire 1 illustrated in FIG. 1, three of the closed sipes 3132 are disposed in each of the regions partitioned by the open sipe 3131 (See FIG. 4).

However, the present technology is not limited thereto, and four or more of the closed sipes 3132 may be disposed in each of the regions partitioned by the open sipe 3131 (see FIG. 6). For example, in the modified example illustrated in FIG. 6, four of the closed sipes 3132 are disposed in each of the regions. Additionally, of these, two of the closed sipes 3132 are disposed so as to be in line with each other and adjacent to the open sipe 3131. The remaining two closed sipes 3132 are disposed so as to be in line with each other and be positioned more toward the circumferential direction edge side of the blocks 313 than the other two closed sipes 3132. Moreover, the two closed sipes 3132 on the circumferential direction edge side of the blocks 313 have a shorter structure than the other two closed sipes 3132. Imaginary lines joining center points of the four closed sipes 3132 form a trapezoidal shape having a short side on the edge side of the blocks 313 in the tire circumferential direction (truss arrangement).

Note that in this pneumatic tire 1, "sipe" refers to a cut formed in a land portion and generally has a sipe width of less than 1.0 [mm]. "Open sipe" refers to a sipe that is open at both ends to each edge of a land portion. "Closed sipe" refers to a sipe where both ends terminate within a land portion. "Semi-closed sipe" refers to a sipe where a first end is open to an edge of a land portion and a second end terminates within the land portion.

Additionally, the groove width of the circumferential main groove, the groove width of the lug grooves, the sipe width, and the like are measurements taken when the tire is assembled on a standard rim, inflated to a prescribed internal pressure, and in an unloaded state.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Also, "prescribed internal pressure" refers to the "highest air pressure" defined by JATMA, the maximum value of "tire load limits at various cold inflation pressures" defined by TRA, or "inflation pressures" defined by ETRTO. Moreover, a "stipulated load" refers to "maximum load capacity" defined by JATMA, the maximum value in "tire load limits at various cold inflation pressures" defined by TRA, or "load capacity" defined by ETRTO. However, with JATMA, in the case of passenger car tires, the prescribed internal pressure is an air pressure of 180 [kPa], and the stipulated load is 88[%] of the maximum load capacity.

Effects

As described above, this pneumatic tire 1 includes three or more of the circumferential main grooves 21 and 22 extending in the tire circumferential direction, two or more rows of the center land portions 31 and the pair of shoulder land portions 32 partitioned by these circumferential main grooves 21 and 22 (see FIG. 2). Additionally, the center land portions 31 include the circumferential narrow groove 311 extending in the tire circumferential direction so as to partition the center land portions 31 in the tire width direction; the plurality of lug grooves 312 disposed in each region of each of the center land portions 31 partitioned by the circumferential narrow groove 311, extending in the tire width direction so as to partition each of the regions of the center land portions 31 in the tire circumferential direction; and the plurality of blocks 313 partitioned by the circumferential narrow groove 311 and the plurality of lug grooves 312 (see FIG. 3). The blocks 313 of the center land portions 31 include one open sipe 3131 extending in the tire width direction so as to partition the blocks 313 in the tire circumferential direction, and three or more closed sipes 3132 disposed in each of the regions of each of the blocks 313 partitioned by the open sipe 3131.

With such a configuration, the blocks 313 of the center land portions 31 are bisected in the tire circumferential direction by the one open sipe 3131, and each divided region thereof has three or more closed sipes 3132. Therefore, the edge component of the blocks 313 is ensured. Such a configuration is beneficial because performance on snow and ice of the tire is enhanced.

With this pneumatic tire 1, the relationship between the width direction length a and the circumferential direction length b of the blocks 313 is such that $1.2 \leq b/a \leq 1.6$ (see FIG. 3). This leads to the benefits of the aspect ratio b/a of the blocks 313 being optimized and uneven wear resistance performance and performance on ice of the tire both being achieved. For example, it is not preferable that $b/a<1.2$ because block rigidity with respect to the tire circumferential direction will decline and uneven wear resistance will decrease. Additionally, it is not preferable that $1.6<b/a$ because block rigidity with respect to the tire width direction will decline leading to a decline in uneven wear resistance, and the edge component of the blocks with respect to the tire circumferential direction will decrease leading to a decline in the performance on ice.

With this pneumatic tire 1, the relationship between the groove width W of the lug grooves 312 and the circumferential direction length b of the blocks 313 is such that $0.20 \leq W/b \leq 0.25$ (see FIG. 3). This leads to the benefits of the groove width W of the lug grooves 312 being optimized; snow discharge properties and water discharge properties of the lug grooves 312 and edge effects being ensured; and the performance on snow and ice of the tire being enhanced. For example, it is not preferable that W/b<0.20 because shearing force in snow of the blocks cannot be ensured, leading to a decline in performance on snow of the tire. Moreover, it is not preferable that 0.25<W/b because the edge component of the blocks with respect to the tire circumferential direction will decrease, leading to a decline in the performance on ice.

With this pneumatic tire 1, the relationship between the groove depth H2 of the circumferential narrow groove 321 and the groove depth H1 of the deepest circumferential main groove 22 is such that $0.50 \leq H2/H1 \leq 0.70$. This leads to the benefits of the groove depth H2 of the circumferential narrow groove 321 being optimized, the traction properties being ensured, and the performance on snow and ice of the tire being enhanced. For example, it is also not preferable that H2/H1<0.50 because the traction properties will decline, leading to a decline in the performance on snow and ice of the tire. Moreover, it is not preferable that 0.70<H2/H1 because the block rigidity will decline, leading to a decrease in the uneven wear resistance of the tire.

With this pneumatic tire 1, the plurality of blocks 313 is disposed in a staggered manner in the tire circumferential direction (see FIG. 2). This leads to the benefits of the concentration of stress in each of the blocks 313 when the tire contacts the ground being suppressed and the uneven wear resistance performance of the tire being enhanced.

With this pneumatic tire 1, the angle of inclination θ with respect to the tire circumferential direction of the circumferential narrow groove 311 is within the range $5 [\deg] \leq \theta \leq 15 [\deg]$ (see FIG. 3). This leads to the benefits of the edge component of the blocks 313 with respect to the tire circumferential direction being ensured and the performance on ice of the tire being enhanced.

With this pneumatic tire 1, the blocks 313 have the semi-closed sipe 3133 that is open to the edge in the tire width direction of the blocks 313 (see FIG. 4). This leads to the benefits of uneven wear at the edge in the tire width direction of the blocks 313 being suppressed and the uneven wear resistance performance of the tire being enhanced.

With this pneumatic tire 1, the blocks 313 have the notch 3134 at the opening of the open sipe 3131 to the circumferential narrow groove 311 (see FIGS. 3 and 4). This leads to the benefits of the edge component of the blocks 313 being ensured and the performance on snow and ice of the tire being enhanced.

With this pneumatic tire 1, the closed sipes 3132 has a bent shape (see FIG. 4). This leads to the benefits of the edge component of the blocks 313 being increased and the performance on ice of the tire being enhanced.

With this pneumatic tire 1, the open sipe 3131 has the zigzag shape and the amplitude A of the zigzag shape is within the range $1.0 [mm] \leq A \leq 3.0 [mm]$ (see FIG. 5). This leads to the benefits of the edge component of the blocks 313 being increased, leading to an enhancement in the performance on ice of the tire; and the amplitude A of the zigzag shape being optimized, leading to an enhancement in the uneven wear resistance performance of the tire.

Working Examples

Figure 7A:
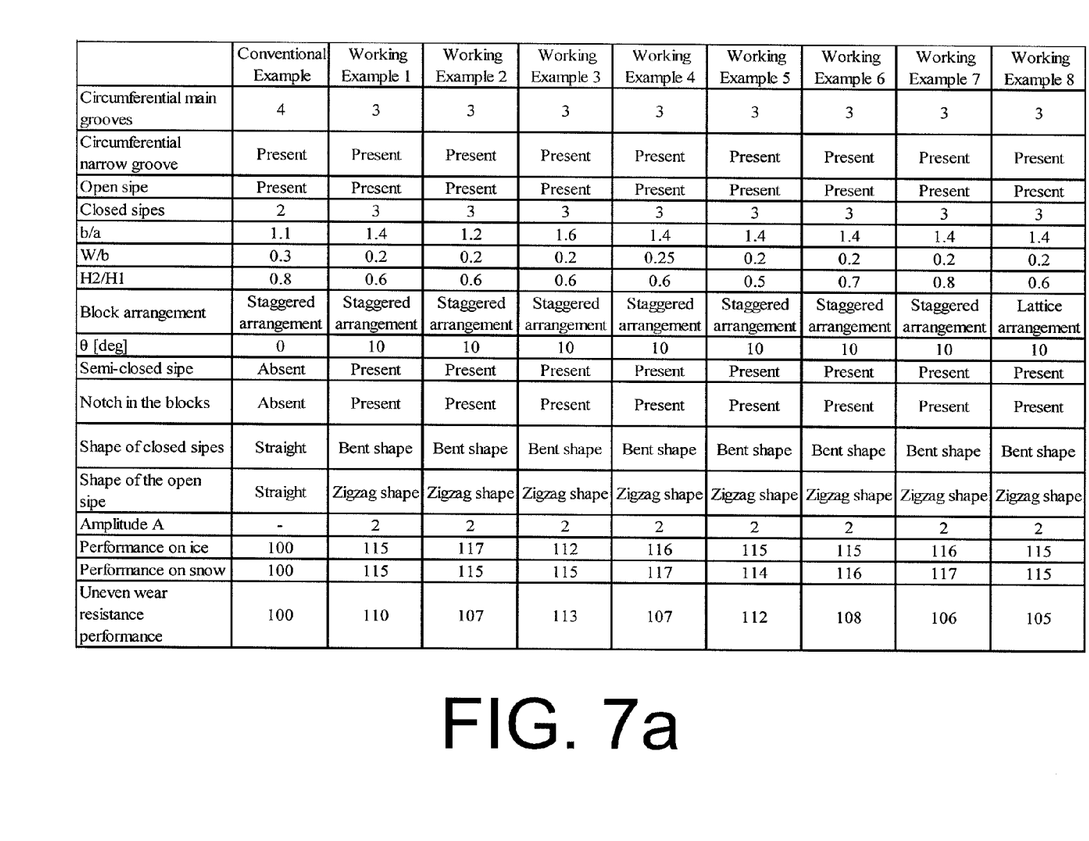
FIGS. 7a-7b include a table showing the results of the performance testing of pneumatic tires according to the embodiments of the present technology.
Figure 7B:
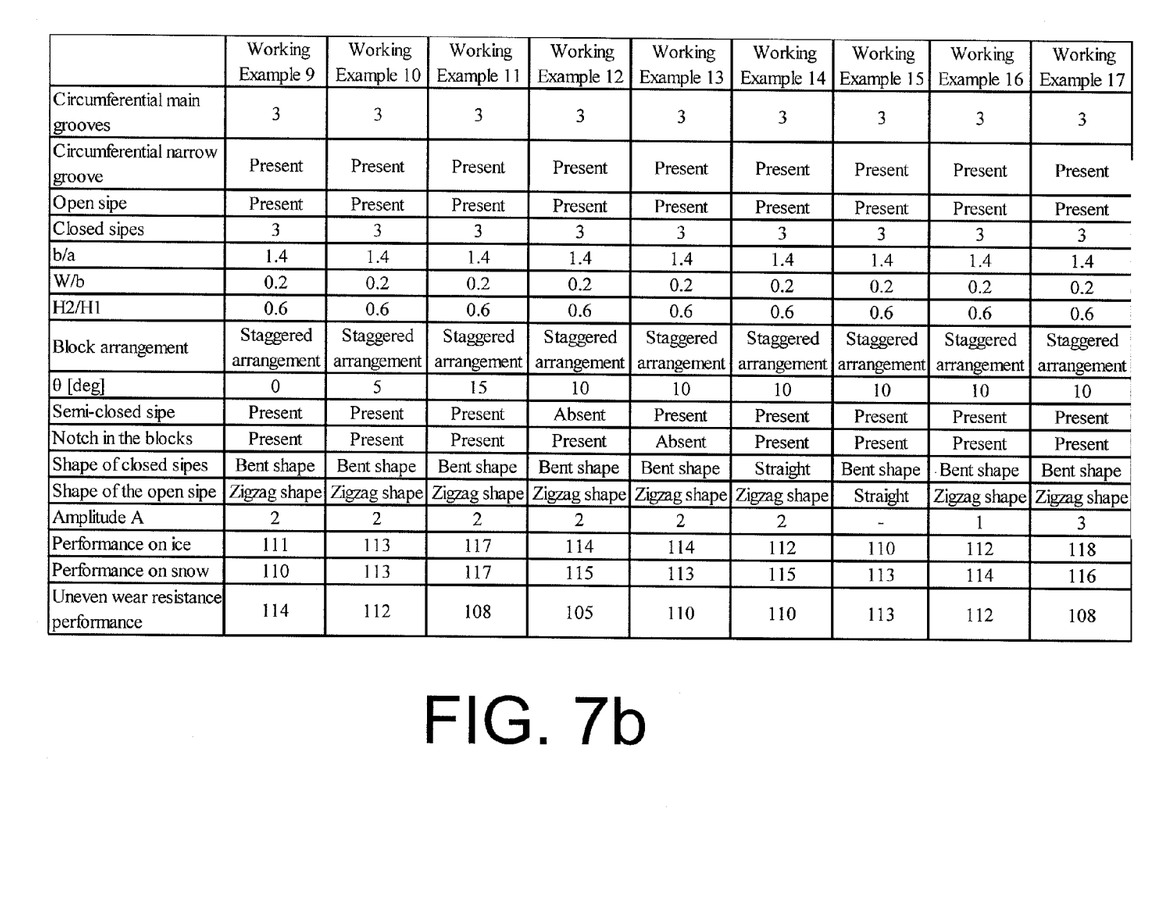
Figure 8:
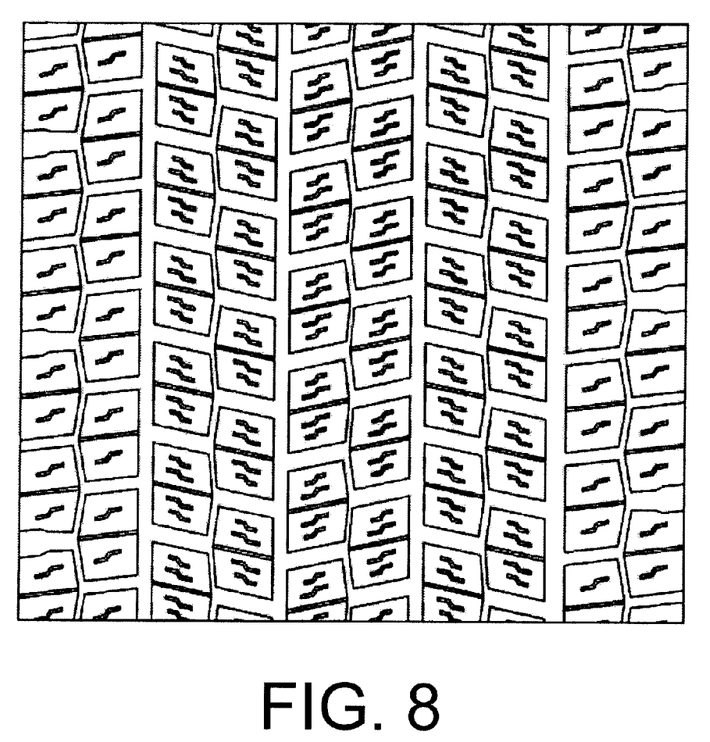
FIG. 8 is an explanatory drawing illustrating a pneumatic tire of a conventional example.

FIGS. 7a-7b include a table showing the results of performance testing of pneumatic tires according to the embodiments of the present technology. FIG. 8 is an explanatory drawing illustrating a pneumatic tire of a conventional example.

In the performance testing, a plurality of mutually differing pneumatic tires were evaluated for (1) performance on ice, (2) performance on snow, and (3) uneven wear resistance performance (see FIG. 4). Pneumatic tires with a tire size of 275/80R22.5 were assembled on JATMA defined standard rims; and a maximum air pressure and a maximum load capacity defined by JATMA were applied to these pneumatic tires. Additionally, these pneumatic tires were mounted on a 2-D4 test vehicle (two front wheels-four rear driving wheels).

(1) Evaluation of performance on ice: The pneumatic tires were mounted on a test vehicle and the test vehicle was driven on a predetermined icy road surface. Evaluation was performed by measuring the braking distance from a traveling speed of 40 [km/h]. In this evaluation, the index value of the pneumatic tire of the Conventional Example was set as the standard score (100), and higher scores were preferable.

(2) Evaluation of performance on snow: The pneumatic tires were mounted on a test vehicle and the test vehicle was driven on a predetermined snowy road surface. Evaluation was performed by measuring the braking distance from a traveling speed of 40 [km/h]. In this evaluation, the index value of the pneumatic tire of the Conventional Example was set as the standard score (100), and higher scores were preferable.

(3) Evaluation of uneven wear resistance performance: The pneumatic tires were mounted on a test vehicle and the test vehicle was driven on an ordinary paved road for 5,000 [km]. Thereafter, a difference in wear amount between an area of greatest wear and an area of least wear within one block was measured for each block. These evaluations were indexed based on the measurement results and the index value of the pneumatic tire of the Conventional Example was set as the standard score (100). In this evaluation, higher scores were preferable.

The pneumatic tire 1 of Working Example 1 had the configuration depicted in FIG. 2, and included three of the circumferential main grooves 21 and 22, two rows of the center land portions 31, and a pair of the shoulder land portions 32. Additionally, the center land portions 31 included the circumferential narrow groove 311, the plurality of lug grooves 312, and the plurality of blocks 313 (see FIG. 3). The blocks 313 of the center land portions 31 had one of the open sipe 3131, three of the closed sipes 3132, and four of the semi-closed sipes 3133. The groove width of the circumferential main grooves 21 and 22 was 8.0 [mm], the groove width of the circumferential narrow groove 311 was 2.8 [mm], and the groove width of the lug grooves 312 was 7.5 [mm]. The blocks 313 of the center land portions 31 were arranged in a staggered manner in the tire circumferential direction. Moreover, the relationship between the depth H3 of the semi-closed sipe 3133 and the groove depth H1 of the deepest circumferential main groove 22 was such that $0.40 \leq H3/H1 \leq 0.50$. The pneumatic tires 1 of Working Examples 2 to 17 are modified examples of the pneumatic tire 1 of Working Example 1.

A pneumatic tire of a Conventional Example had the configuration depicted in FIG. 8.

It is clear from test results that with the pneumatic tires 1 of Working Examples 1 to 17, the performance on ice, the performance on snow, and the uneven wear resistance performance were enhanced (see FIGS. 7a-7b). Moreover, in a comparison of Working Examples 1 to 3, it is clear that the uneven wear resistance performance and the performance on ice of a tire are both achieved when the aspect ratio b/a of the blocks 313 is optimized. In a comparison of Working Examples 1 and 4, it is clear that the performance on snow and ice of a tire is enhanced when the groove width W of the lug grooves 312 is optimized. In a comparison of Working Examples 1 and 5 to 7, it is clear that the performance on snow and ice of a tire is enhanced when the groove depth H2 of the circumferential narrow groove 321 is optimized. In a comparison of Working Examples 1 and 8, it is clear that the uneven wear resistance performance of a tire is enhanced when the blocks 313 of the center land portions 31 are arranged in a staggered manner.

Furthermore, in a comparison of Working Examples 1 and 9 to 11, it is clear that the performance on ice of a tire is enhanced when the angle of inclination θ of the circumferential narrow groove 321 is optimized. In a comparison of Working Examples 1 and 12, it is clear that the uneven wear resistance performance of a tire is enhanced when the blocks 313 have the semi-closed sipe 3133. In a comparison of Working Examples 1 and 13, it is clear that the performance on snow and ice of a tire is enhanced when the blocks 313 have the notch 3134. In a comparison of Working Examples 1 and 14, it is clear that the performance on ice of a tire is enhanced when the closed sipes 3132 have a bent shape. In a comparison of Working Examples 1 and 15 to 17, it is clear that the performance on ice and the uneven wear resistance performance of a tire is enhanced when the open sipe 3131 has a zigzag shape and the amplitude A of that zigzag shape is optimized.

What is claimed is:

1. A pneumatic tire comprising three or more circumferential main grooves extending in a tire circumferential direction, two or more rows of center land portions and a pair of shoulder land portions partitioned by the circumferential main grooves; wherein
the center land portions comprise: a circumferential narrow groove extending in the tire circumferential direction so as to partition the center land portions in a tire width direction; a plurality of lug grooves disposed in each region of the center land portions partitioned by the circumferential narrow groove, extending in the tire width direction so as to partition each of the regions of the center land portions in the tire circumferential direction; and a plurality of blocks partitioned by the circumferential narrow groove and the plurality of lug grooves, wherein
the blocks comprise one open sipe extending in the tire width direction so as to partition the blocks in the tire circumferential direction; and three or more closed sipes disposed respectively in each of the regions of the blocks partitioned by the open sipe, and
an arrangement of the closed sipes in each of the regions partitioned by the open sipe comprises a truss arrangement such that imaginary lines joining center points of the sipe length of the closed sipes in each of the regions forms a rough triangular shape having a bottom side on the open sipe side.

2. The pneumatic tire according to claim 1, wherein a relationship between a width direction length a and a circumferential direction length b of the blocks is such that $1.2 \leq b/a \leq 1.6$.

3. The pneumatic tire according to claim 2, wherein a relationship between a groove width W of the lug grooves and the circumferential direction length b of the blocks is such that $0.20 \leq W/b \leq 0.25$.

4. The pneumatic tire according to claim 3, wherein a relationship between a groove depth H2 of the circumferential narrow groove and a groove depth H1 of the deepest circumferential main groove is such that $0.50 \leq H2/H1 \leq 0.70$.

5. The pneumatic tire according to claim 4, wherein the plurality of blocks is disposed in a staggered manner in the tire circumferential direction.

6. The pneumatic tire according to claim 5, wherein the circumferential narrow groove has a zigzag shape, and an angle of inclination θ of the circumferential narrow groove with respect to the tire circumferential direction is within a range $5[\deg] \leq \theta \leq 15 [\deg]$.

7. The pneumatic tire according to claim 6, wherein the blocks comprise a semi-closed sipe that is open to an edge of the blocks in the tire width direction.

8. The pneumatic tire according to claim 7, wherein the blocks comprise a notch at an opening of the open sipe to the circumferential narrow groove.

9. The pneumatic tire according to claim 8, wherein the closed sipes comprise a bent shape.

10. The pneumatic tire according to claim 9, wherein the open sipe comprises a zigzag shape, and an amplitude A of the zigzag shape is within a range $1.0 [mm] \leq A \leq 3.0 [mm]$.

11. The pneumatic tire according to claim 1, wherein a relationship between a groove width W of the lug grooves and the circumferential direction length b of the blocks is such that $0.20 \leq W/b \leq 0.25$.

12. The pneumatic tire according to claim 1, wherein a relationship between a groove depth H2 of the circumferential narrow groove and a groove depth H1 of the deepest circumferential main groove is such that $0.50 \leq H2/H1 \leq 0.70$.

13. The pneumatic tire according to claim 1, wherein the plurality of blocks is disposed in a staggered manner in the tire circumferential direction.

14. The pneumatic tire according to claim 1, wherein the circumferential narrow groove has a zigzag shape, and an angle of inclination θ of the circumferential narrow groove with respect to the tire circumferential direction is within a range $5[\deg] \leq \theta \leq 15 [\deg]$.

15. The pneumatic tire according to claim 1, wherein the blocks comprise a semi-closed sipe that is open to an edge of the blocks in the tire width direction.

16. The pneumatic tire according to claim 1, wherein the blocks comprise a notch at an opening of the open sipe to the circumferential narrow groove.

17. The pneumatic tire according to claim 1, wherein the closed sipes comprise a bent shape.

18. The pneumatic tire according to claim 1, wherein the open sipe comprises a zigzag shape, and an amplitude A of the zigzag shape is within a range $1.0 [mm] \leq A \leq 3.0 [mm]$.

19. A pneumatic tire comprising three or more circumferential main grooves extending in a tire circumferential direction, two or more rows of center land portions and a pair of shoulder land portions partitioned by the circumferential main grooves; wherein
the center land portions comprise: a circumferential narrow groove extending in the tire circumferential direction so as to partition the center land portions in a tire width direction; a plurality of lug grooves disposed in each region of the center land portions partitioned by the circumferential narrow groove, extending in the tire width direction so as to partition each of the regions of the center land portions in the tire circumferential direction; and a plurality of blocks partitioned by the circumferential narrow groove and the plurality of lug grooves, wherein
the blocks comprise one open sipe extending in the tire width direction so as to partition the blocks in the tire circumferential direction; and three or more closed sipes disposed respectively in each of the regions of the blocks partitioned by the open sipe, and an arrangement of the closed sipes in each of the regions partitioned by the open sipe comprises a truss arrangement such that imaginary lines joining center points of the sipe length of the closed sipes in each of the regions forms a rough trapezoidal shape having a long side on the open sipe side.

* * * * *